FIG.-3

Edward B. Schumacher
John S. Wiedemann  Inventors

By W. O. Heilman
Patent Attorney

Edward B. Schumacher
John S. Wiedemann   Inventors

By W. V. Heilman
Patent Attorney

FIG.-7

United States Patent Office 3,229,473
Patented Jan. 18, 1966

3,229,473
VESSEL FOR TRANSPORTING LOW TEMPERATURE LIQUIDS
Edward B. Schumacher, Matawan, and John S. Wiedemann, Millington, N.J., assignors to Esso Research and Engineering Company, a corporation of Delaware
Filed Dec. 7, 1962, Ser. No. 243,168
4 Claims. (Cl. 62—55)

This is a continuation-in-part of Serial No. 110,296, filed May 5, 1961, now abandoned, which in turn is a continuation-in-part of application Serial No. 818,109 filed June 4, 1959, now abandoned.

This invention relates to means for transporting low temperature liquids in bulk. It relates particularly to ship means for bulk transportation of low temperature liquids, and it relates more particularly to a vessel or tank ship construction suitable for bulk transportation of low temperature liquids at substantially atmospheric pressure with a minimum of loss of the liquid transported.

The present invention is particularly applicable to the transportation of low-boiling hydrocarbons such as liquid methane, ethylene, ethane, propane, and the like. The named materials have normal boiling points (boiling temperature under pressure of one atmosphere), critical temperatures and critical pressures approximately as follows:

| Material | Normal B.P. (° F.) | Critical Temp. (° F.) | Critical Press. (p.s.i.a.) |
|---|---|---|---|
| Propane | −43.7 | 206.24 | 617 |
| Ethane | −127.6 | 90.09 | 708 |
| Ethylene | −154.8 | 49.8 | 742 |
| Methane | −258.6 | −116.5 | 673 |

It is evident from the above tabulation that some of these hydrocarbons, particularly methane, have normal boiling points and critical temperatures so low and critical pressures so high that there is neither a theoretical nor practical possibility of maintaining them as liquids at ambient or atmospheric temperatures simply by the application of pressure.

Considerable interest has been shown in recent years, however, in the storage and transportation of hydrocarbon materials such as those named in the liquid state and at substantially atmospheric pressure. Under these conditions the cold liquids are placed in thermally insulated containers and allowed to vaporize or boil off as heat leaks into them through the container structure. The vapors thus produced may be either vented directly to the atmosphere, consumed as a gaseous fuel, or recondensed by suitable refrigeration equipment and returned as liquid to the insulated container. Obviously the efficiency and economy of such storage and transportation of low boiling liquids are dependent to a large degree upon the effectiveness of the thermal insulation applied to the liquid container.

Another problem besides that of vaporization loss of stored materials which arises in the course of storing and transporting low-boiling liquids, particularly those boiling in the lower part of the range set forth in the above tabulation, is that of embrittlement of metallic structural components of the liquid container. At temperatures of the order of that of liquid methane at atmospheric pressure (−259° F.), ordinary ferrous materials such as low carbon steel suffer a pronounced loss of energy absorbing capacity at high rates of strain, that is, loss of impact resistance. Storage tanks in general and storage tanks aboard ship in particular may be expected to be exposed to some shock loads during their working lives, even though such loads be applied accidentally. Accordingly, when low-boiling materials such as methane or natural gas having a high methane content are liquefied for storage and/or transportation in bulk thought must be given to the matter of loss of impact resistance of a steel-walled container and the attendant increased susceptibility of this structure to brittle fracture.

It will be readily understood that the physical failure of a wall of a tank containing cold liquid hydrocarbons in bulk, liquid methane for example, could be extremely dangerous to both life and property. To minimize the possibility of such failure, proposals have been made for storing liquid methane and other cold materials in steel tanks or container shells provided with internal insulation of substantial thickness. By placing the insulation on the inside of the steel container shell rather than on the outside, the shell material is allowed to remain at substantially atmospheric temperature for its entire thickness even though the container be fully charged with cold liquid. In this way low carbon, relatively inexpensive steels may be used in the tank structure instead of resort having to be had to costly alloy steels or other materials retaining significant impact resistance properties at low temperatures.

The insulating materials which have been proposed most frequently for such use according to the teachings of the prior art are balsa wood and cork in the form of rather sizable blocks or slabs. These materials are reasonably effective as thermal insulators, but in the form applied or proposed to be applied make for a rather expensive construction. This is so not only because balsa and cork are not particularly inexpensive on a volume basis, but also because of the carpentry and joiner work necessary for proper fitting of the insulation segments to the metal tank shell and to each other.

Whether the insulation comprises blocks or slabs of the traditional materials or be otherwise constructed, however, direct exposure of the insulating material to the cold liquid being stored or transported has usually not been desired. Accordingly, a metal liner or inner tank shell is placed within the insulating blocks, this liner being made of aluminum or another metal retaining a significant impact resistance property at very low temperatures. But this liner may itself create problems in the customary tank construction because even though it be fitted snugly to the insulation blocks at room temperature it may tend to pull away from them at least along certain interfaces as the tank structure is cooled down in the course of being filled due to incompatibility of coefficients of thermal expansion. Such pulling away has the effect of creating undesirable voids or gaps in the tank structure.

In recent years a number of thermal insulation materials of a fibrous, finely divided or castable nature have come into service in various applications. These materials include but are not limited to mineral wool, perlite (volcanic ash), and rock cork to designate them by their popular names. They have the general properties of being easily packed, poured, or molded to fill irregular volumes or conform to irregular surfaces and to retain a significant degree of pliability and resilience once installed.

According to the present invention a vessel for transporting low temperature liquids is provided in which the insulation between cargo liquid inner and outer tank shells both independent of the hull structure of the vessel is at least partially composed of fibrous, finely divided or castable material of the general nature just described to give significant improvement over the prior art with respect to both cost reduction and increased insulation efficiency.

Further, according to this invention, means are provided for positively maintaining the integrity of this insulation against icing damage by pressurizing the insulation region between the inner and outer cold cargo liquid tank shells to prevent leakage of moist air thereinto.

Still further, according to this invention, means are provided for rendering inert the atmosphere in the inspection space around the outer cold liquid tank shell to prevent creation of combustible gaseous mixtures therein upon the leakage thereinto of vaporized cargo materials.

Even still further, according to this invention, means are provided for conveniently loading cold cargo liquids into and discharging such liquids from the insulated storage tanks of the afore-described vessel, and for either recondensing and preserving or else distantly venting the vapors boiled off from these storage tanks.

The nature and substance of this invention will be more clearly perceived and fully understood by referring to the following description and claims taken in connection with the accompanying drawings in which:

Figure 1:
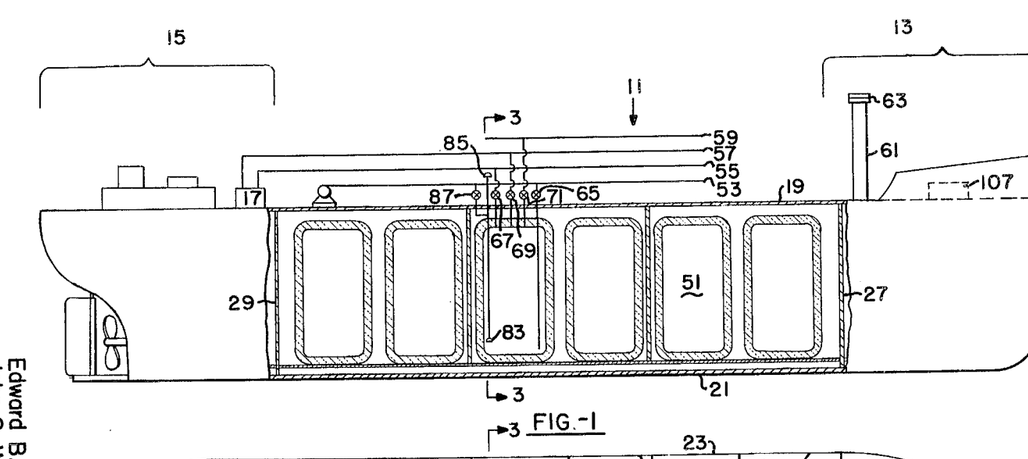
FIG. 1 represents a side elevation view, partially broken away, of a tank vessel designed to carry liquefied, normally gaseous materials such as liquefied natural gas according to the present invention, particularly illustrating in schematic form the piping systems for handling the cold liquid cargo material and the vapors generated therefrom.
Figure 2:
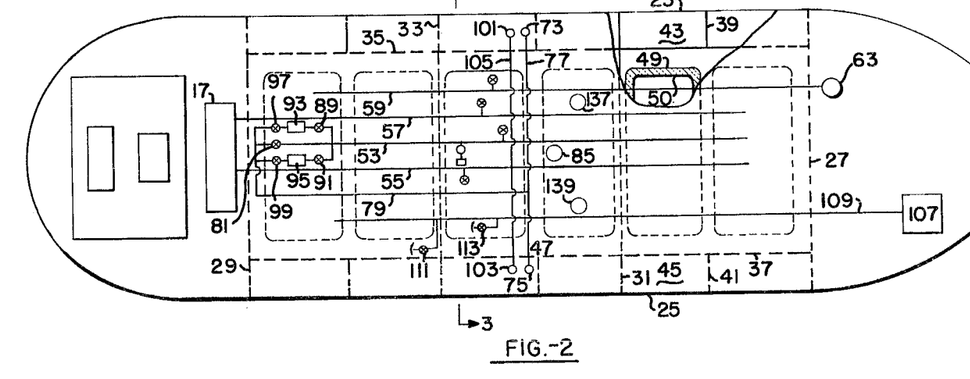
FIG. 2 represents a deck plan view of the tank vessel of FIG. 1.

Referring now to the drawings in detail, especially to FIGS. 1 and 2 thereof, a marine vessel externally configured more or less similarly to a conventional tank ship is designated 11. It has fore and aft hull and super structures 13 and 15 of customary form except that the aft super structure includes a refrigeration apparatus installation 17 which will be described in greater detail presently. Ship 11 is characterized by a main deck 19, bottom plating 21, and port and starboard shell plating 23 and 25.

Transverse bulkheads 27 and 29 define the fore and aft limits of the middlebody of the ship wherein the various tank spaces for the storage of cargo liquids are located. Intermediate the bulkheads 27 and 29 are a number of other transverse bulkheads such as 31 and 33 running the full width of the ship. Extending fore and aft within ship 11 at least between bulkheads 27 and 29 are port and starboard longitudinal bulkheads 35 and 37, and extending transversely between the longitudinal bulkheads and the shell plating there may be local, non-continuous bulkheads such as 39 and 41. The structural items of deck, bulkheads, shell plating, and bottom plating so far designated will serve to define a series of port and starboard wing tank spaces such as 43 and 45. These wing tanks may be used for storage of materials which are ordinarily liquids at atmospheric conditions of temperature and pressure. Such liquids would include various crude petroleums and petroleum distillates.

The central part of the vessel is divided into a plurality of compartments such as 47 which are bounded fore and aft by continuous transverse bulkheads such as 31 and 33, and laterally by longitudinal bulkheads 35 and 37. Within each of these compartments are located two tank structures for the storage of cold liquid cargo materials. These tank structures will be more completely described presently, but may here be said to each be characterized by an outer steel shell 49, an inner metal shell 50 of a material such as aluminum in non-contacting relation to the outer shell and thermal insulation material substantially filling the region intermediate the two shells. A cold liquid storage volume 51 is defined within the inner shell 50.

All of the storage regions 51 are connected to a manifold system comprising a main liquid filling and discharge line 53, a recondensed liquid return line 55, a vapor suction line 57 going to the inlet connection of refrigeration apparatus 17, and a vapor vent line 59 going to king post 61 which is hollow, and which is fitted at its upper end with an exhaust head 63 wherefrom vapors may be finally vented to the atmosphere.

Considering the individual connections associated with a particular tank space 51, an admission valve 65 in a branch off of line 53 must be opened to allow cold liquid to be filled into the tank from one of the main shore filling connections to be identified presently. An admission valve 67 in a branch off of line 55 must be opened to allow cold liquid to be filled into the tank from refrigeration apparatus 17 or from one of the auxiliary shore filling connections to be identified presently. An outlet valve 69 in a branch off of line 57 must be opened to allow vapor to flow from the tank to the inlet connection of refrigeration apparatus 17 in which apparatus this vapor may be recondensed. Connection from tank space 51 to vapor vent line 59 is made through a branch which contains a pressure relief valve 71. This valve is set to open at relatively low pressure on the order of a half to one and a half pounds per square inch gauge. Thus, cargo material vapors generated within tank space 51 which are not drawn off through suction line 57 cannot accumulate to any significant pressure before they escape through the atmospheric vent system, that is, through line 59 and king post 61, and finally out of exhaust head 63.

On the main deck 19 of ship 11 are means whereby connection may be made to a short facility (or another ship) to allow cold liquid to be filled into or discharged from tank spaces 51. This means includes the main shore connection valves 73 and 75 located port and starboard respectively. These valves terminate a common line 77 running transversely across deck 19, and from a T-connection in this line a liquid line 79 runs directly aft to the vicinity of refrigeration apparatus 17. Connection is made from line 79 as shown through valve 81 to liquid line 53. This valve and valve or valves 65 will be open when cold liquid cargo material is being filled into tank spaces 51 from a shore facility through valve 73 or 75.

Within each tank space 51 there is a deep well pump 83 which is driven by conventional means such as a steam turbine 85 located at about the main deck level. The discharge line of this pump is connected to liquid line 53 through a valve 87. Near its aft end, liquid line 53 is connected through two valves 89 and 91 to the inlet sides of booster pumps 93 and 95. These pumps are provided respectively with discharge valves 97 and 99 through which connection is made as shown to liquid line 79. When cargo liquid is to be discharged from tank space 51, one or both of valves 65 and 81 will be closed; valve 87 will be open; at least one set of booster pump valves 89 and 97 or 91 and 99 will be open, and one of the main deck valves 73 or 75 will be open also. Pressure relief valve 71 might be reset to a greater opening valve in order to allow a higher vapor pressure to be built up above the surface of liquid in tank space 51 to insure that this liquid will be driven positively into the suction of pump 83. Such resetting of the relief valve may be particularly desirable when the level of liquid in tank space 51 is rather low.

Close by valves 73 and 75 are two valves 101 and 103 located port and starboard on main deck 19. These valves terminate a common line 105 running transversely across the deck. Recondensed liquid return line 55 passes through a cross fitting in line 105. It may be seen, therefore, that valves 101 and 103 can be used as auxiliary connections for filling tank spaces 51 from the shore.

Located in the forward region 13 of ship 11 is a dry inert gas source 107, for example a source of dry nitrogen gas. This source may be either an actual gas generating plant or a bank of cylinders suitably manifolded, and which are replenished from time to time. Running aft from gas source 107 is an inert gas main 109. A branch from this is connected to each one of the compartments 47 through a pressure reducing and regulating valve 111. Another branch from this main is connected to the insulation region between the outer and inner shells 49 and 50 of each one of the cold liquid storage tanks through a pressure reducing and regulating valve 113. The inert gas system has at least two principal purposes. The first of these is to condition the atmosphere in compartment 47, and the second is to protect the insulation between tank shells 49 and 50 against icing.

Considering the first purpose, if there should be leakage of cold cargo liquid through both tank shells 49 and 50, the leaked material will be vaporized by the time it reaches space 47 outside of shell 49. If this space has an atmosphere of ordinary air, a combustible mixture of air and the cargo material, for example a combustible mixture of air and methane may be created. On the other hand, if compartment 47 has an atmosphere of nitrogen, gaseous methane leaking through tank shell 49 will mix with a material which will not support combustion. Suitable ventilation equipment of a kind well known in the art may be provided for compartment 47 to flush the inert atmosphere, and provide a breathable atmosphere whenever access to this compartment is desired for parties to inspect the outer shells 49 of the cold liquid storage tanks. A suitable sniffing connection may also be provided for compartment 47 to allow sampling of the atmosphere therein. Such a connection would conveniently be located in deck 19.

Considering the second principal purpose of the inert gas system, it will be realized that when cold liquid is introduced in tank space 51, most of the insulation material between tank shells will be considerably chilled. Likewise any gas or vapor between shells 49 and 50 which is initially at substantially atmospheric pressure and ambient temperature will be cooled, and in being cooled will be reduced in pressure. A partial vacuum will thus tend to be created in the insulation. If there be any openings in tank shell 49, and if this shell be surrounded by gas or vapor at atmospheric pressure, there will tend to be a flow of gaseous material from the outside through the shell openings into the insulation.

If the inflowing gaseous material be moist air, the water vapor content thereof will be frozen out on the cold insulation material, icing this material and eventually substantially impairing its thermal insulating properties. By connecting the space between shells 49 and 50 with dry gas source 107, the pressure in this insulation space can be kept at or slightly above atmospheric even though tank space 51 be filled with cold liquid. The inert gas employed should, of course, be one which cannot be condensed by the cold cargo liquid. Reducing and regulating valve 113 should be set somewhat higher than valve 111 so that any gas leakage through shell 49 will always be outwardly from the insulation region.

Insulation of the cargo liquid storage tanks has been mentioned generally in connection with FIGS. 1 and 2, and will be discussed in greater detail presently. It is obvious, however, that all of the piping systems so far mentioned with the exception of the inert gas lines will also be filled with cold materials from time to time. All of the liquid lines such as 53, 55, and 79 should be thermally insulated to reduce evaporative loss of cargo materials. Vapor line 57 should be insulated to prevent unnecessary warming of vapors which are to be recondensed. Vapor vent line 59 may, on the other hand, better be left uninsulated to allow warming and reduction in density of vapors which are being dispersed to the atmosphere.

Figure 3:
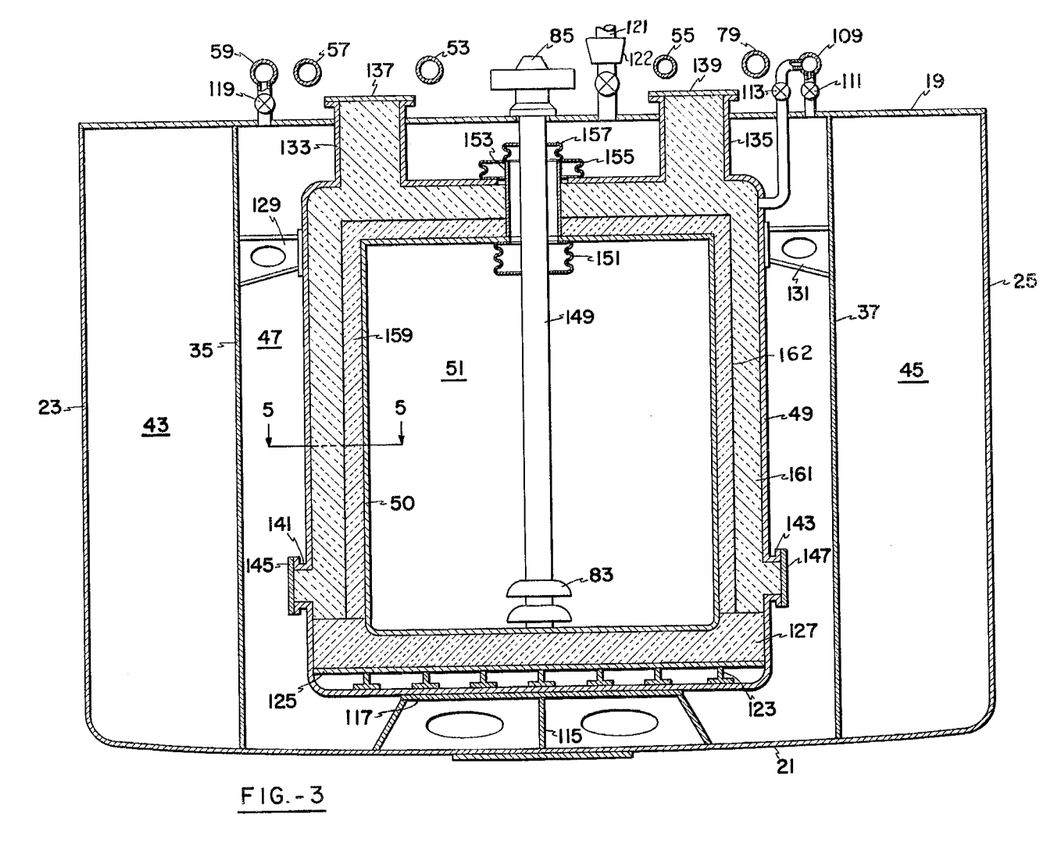
FIG. 3 represents a transverse sectional elevation view of the tank vessel embodying this invention taken along line 3—3 in FIGS. 1 and 2 in the direction of the arrows, particularly illustrating features of support and internal construction of an insulated container for cold liquid cargo material.

Referring next to FIG. 3, the centerline vertical keel of tank ship 11 is designated 115. This is surmounted by a platform structure 117 which is otherwise suitably braced, and which provides immediate support for the cold liquid tank structure of which steel shell 49 defines the outer boundary. The tank structure may be located and secured on platform 117 by any appropriate and customary means, proper allowance being made for dimensional changes due to thermal effects. Piping elements 53, 55, 57, 59, 79, and 109 already described in connection with FIGS. 1 and 2 are illustrated above deck 19. Particularly shown are the valve and piping connections from inert gas line 109 to compartment 47 and to the insulation space between tank shells 49 and 50. Also illustrated are a connection from compartment 47 to vapor vent line 59 containing a valve 119, and a valved vent line 121 leading to compartment 47 from the atmosphere.

It is by means of line 121 and the connection from compartment 47 to vapor vent line 59 that the atmosphere of this compartment may be changed. There may be a supply blower 122 connected in line 121 to provide the necessary air flow. Valve 119 and the valve in line 121 may be of the spring-loaded variety to protect compartment 47 against being overpressured by inert gas or air on the one hand, or against being unduly evacuated on the other.

Now considering particularly the structure of the cold cargo liquid storage tank and its internal attachments, the outer shell 49 will be of steel. Being internally insulated, this steel may be of a low carbon, relatively inexpensive grade. It may of course be of a stainless or other high alloy grade, but the particularly beneficial properties of these considerably more expensive steels will not have significant opportunity of development in the course of such use. On its interior bottom surface, tank shell 49 is fitted with a series of structural elements such as inverted T-beams 123 which support a steel plate 125. Upon this plate there is a layer of thermal insulating material 127 of substantially rigid form.

Rigidity of layer 127 is needed to sustain the weight of a full liquid load in tank space 51 without significant crushing. Layer 127 may be slightly recessed on its upper surface as shown to provide location for the lower end of inner tank shell 50. Materials appropriate for use in layer 127 would include but not be limited to balsa wood, solid cork, glass foam blocks, or insulating concrete. An appropriate insulating concrete would be one comprising a light weight mineral aggregate such as expanded shale or clay with a binder of hydraulic setting cement. Such a concrete would have a density of about 50–80 lbs./ft.$^3$.

The heat path from the bottom plating 21 of ship 11 to any cold liquid cargo in tank space 51 may be examined. Heat will flow in through what may be a fairly easy path of structural plates and shapes as far as the bottom of tank shell 49. From there on to plate 125, however, here will be only a narrow path available through the webs of T-beams 123. It may be thermodynamically desirable and economically worthwhile to make T-beams 123 and plate 125 out of some material such as stainless steel which in comparison with ordinary carbon steels such as that usable for tank shell 49 has a rather low coefficient of thermal conductivity. Thus, it may be seen that even before any inflowing heat reaches the material of layer 127 which is intentionally thermal insulating material, it must travel a rather difficult path. Therefore, the rate of heat leakage into cold liquid in tank space 51 is kept quite low according to the structural arrangements shown in FIG. 3.

Primary location of outer tank shell 49 with respect to the hull structure of ship 11 is effected by its seating and securing on platform 117. To prevent undue sway of his shell, however, with rolling and pitching of ship 11, it is held transversely centered by such means as buffer brackets 129 and 131 secured to longitudinal bulkheads 35 and 37 near the top of the tank shell. These brackets have no effect of restricting movement of the tank due to temperature changes. It is to be clearly understood, of course, that tank shell 49, bulkheads 35 and 37, bottom plating 21, shell plating 23 and 25, and deck plating 19 may and will all be stiffened locally as needed in conformity with standard structural and naval architectural practice.

Precise definition of the tank space 51 is provided by the inner tank shell 50. Since this shell will be in direct contact with the cold liquid cargo, it must be of a material which will not be unduly reduced in impact resistance property or embrittled by temperatures on the order of −259° F. Such materials will include but not be limited to aluminum, alloys of aluminum, copper or cuprous alloys, and stainless steel. The dimensions of inner tank shell 50 with respect to corresponding dimensions of outer shell 49 should be such that adequate spacing for insulation on all exterior surfaces of the inner member will be left between the two shells. It is expected that a mean thickness of about one foot for insulation having the thermal conductivity of balsa wood will be adequate to insure that outer shell 49 remains at substantially ambient temperature when there is a cargo of liquid methane in tank space 51.

Primary location of inner tank shell 50 with respect to outer tank shell 49 is effected by the seating of the inner shell on and in the layer of rigid insulating material 127. To prevent undue sway and lifting of this shell with rolling and pitching of ship 11, lateral and vertical bracing of shell 50 against shell 49 will be required. Prevention of undue sway and lifting of tank shell 50 is necessary for two reasons. The first is the avoidance of undue stressing of the inner tank shell itself and the fittings connected thereto. The second is the avoidance of excessive compression of thermal insulation material on the top and sides of tank shell 50 because of motion of this shell relative to the outer tank shell.

According to this invention, as will be shown in greater detail presently, at least part of the insulation between the tank shells is of a fibrous, non-rigid nature. While such material has significant advantages in its present utilization as will be shown, it is susceptible to damage and loss of insulating properties by continued mechanical working. It is to be understood, therefore, that suitable bracing of a thermally insulating nature such as blocks of balsa wood, cork, or insulating concrete will be positioned and attached between the tank shells 49 and 50 at least near the tops thereof to insure proper relative location of these shells in the course of normal motion of ship 11. In designing and fitting such inter-shell bracing, proper consideration will be given to dimensional changes of inner tank shell 50 due to its operation through a wide range of temperatures.

For reasons that will be made apparent presently, it is desirable for purposes of this invention to have both high and low working access to the insulation region between tank shells 49 and 50. To provide this high access, the outer shell is fitted with a plurality of trunks such as 133 and 135 extending from its top surface upwardly through main deck 19. These trunks are equipped with closure plates 137 and 139. To provide low access to the insulation region, outer tank shell 49 is cut away to give a plurality of ports therethrough just above the upper surface of rigid insulation layer 127. Tank shell 49 is suitably strengthened in way of these ports with stiffener frames 141 and 143 which also provide attaching surfaces for cover plates 145 and 147.

Deep well pump 83 previously identified in connection with FIGS. 1 and 2 is shown in position in FIG. 3 close to the bottom of cold liquid cargo tank space 51. This pump may be of any conventional design suitable for handling hydrocarbon liquids at low temperatures. The prime mover 85 whereby pump 83 is driven is located on and above main deck 19. This prime mover will preferably be a steam turbine of any suitable design and including any appropriate speed reducing gearing. The use of a steam turbine is preferable to that of an electric motor in order to keep any possible sparking apparatus away from a deck region in close association with piping carrying flammable liquids and vapors.

Sleeve 149 extending from turbine 85 downwardly to pump 83 has within it the turbine power transmitting means such as shafting of conventional nature. It may also contain the discharge line of pump 83 where through cold liquid cargo to be unloaded is sent to liquid line 53. This sleeve is attached by a bellows 151 to inner tank shell 50 for maintenance of vapor sealing of the inner shell. An arrangement of collar 153 and bellows 155 of conventional design effects closure between the inner and outer tank shells where they are penetrated by sleeve 149, and an additional bellows seal 157 is applied between this collar and the sleeve.

The arrangement of the thermal insulation material between the top and sides of the outer and inner tank shells 49 and 50 will now be considered. In FIG. 3 this material is illustrated as being in two layers, one layer 159 adjacent the inner tank and another layer 161 adjacent the outer tank. It is contemplated that in this arrangement the inner insulation layer 159 will be in the nature of a felt or batting which may be hung or laid on tank shell 50 while the outer layer 161 may be packed loose fibres, a poured finely divided powder such as an ash, or a foamed-in-place plastic. By any one of these combinations an overall insulation structure will be achieved using comparatively inexpensive materials and having the further advantages not only of ease of installation but also of elasticity or flowability to accommodate changes in spacing between the inner and outer tank shells due to temperature changes in these shells, variations in static pressure of the cold liquid cargo, or pitching or rolling of ship 11.

A suitable material for inner insulation layer 159 is mineral or rock wool felt sometimes referred to as rock cork. The fibrous wool is produced by blowing steam through a molten mixture of rock and/or slag, or by spinning the molten mixture. A semi-rigid felt is then made by mixing the wool with an organic binder such as asphalt or a phenolic resin and allowing this mixture to set with or without the application of heat. After setting in a proper mold, the felt may be cut into strips or patches of convenient size. In addition to being of low thermal conductivity, mineral wool felt is water repellent, chemically neutral (pH ranges from 7 to 8), non-settling, and non-combustible. Also, and quite important for purposes of this invention, mineral wool felt has a significant degree of resilience. To fabricate inner insulation layer 159, strips of this felt are secured with clips or studs on the top and sides of tank shell 50. Adjacent strips may be joined by an insulating tape, but no adhesive bond is required between the felt and the outer surface of the inner tank.

The outer insulation layer 161 may also be mineral wool, but in the form of loose fibres rather than a felt. There will be a certain optimum density of packing of these fibres in respect of their insulating effect. When such fibres are used for outer layer 161, the outer tank shell 49 will desirably be erected around the inner shell 50 already covered with inner insulation layer 159. In this way packing of the outer insulation layer can take place progressively as the lateral panels of the outer tank rise. In another method, these lateral panels can have the mineral wool fibres previously attached to them in the proper thickness and density by studs or grillework as will be shown in FIGS. 4 and 5, and thus insulation and outer tank structure will be erected simultaneously. By either method, however, what is desired to be obtained is a resilient fibrous filling of the whole of the outer insulation region between the inner insulation layer 159 and the outer tank shell 49.

Unlike the felted material, the loose mineral wool fibres will tend to settle and achieve a higher density than desirable. This tendency and the tendency for unblown slag globules to break away from the fibres will be accelerated if there be any relative working of the outer and inner tank shells 49 and 50. To prevent undue densification of the outer insulation, cover plates 145 and 147 may be removed from time to time, and compacted fibrous material and collected slag globules pulled and swept out of the lower part of the outer insulation region which may then be repacked to the proper density. Fibrous material may be added to the upper part of the outer insulation region through trunks 133 and 135 as it is needed.

Another fibrous material suitable for use as outer insulation layer 161 is fibrous glass or glass wool. Glass fibres are produced by steam or air jets which impinge upon and break up molten streams of glass. After the fibres are blown, they form a tangled mass whose thermal insulating properties are determined by such factors as size and length of the fibres, and the density to which they are packed. Besides existing as loose fibres, glass wool may be bonded with, for example, a phenolic resin binder to form semi-rigid batts similar to those of the felted mineral wool described previously. In this condition, glass wool may be used as an inner insulation layer 159.

In connection with fibrous insulation generally, it is to be understood that there is no thermodynamic prohibition against using either bonded or loose fibers packed to the appropriate density to occupy the whole of the insulation region between the outer and inner tank shells 49 and 50. The choice between using all felted or all loose fibres or part one and part the other in any individual tank structure will depend largely upon the size and configuration of the particular installation. The special significance and need of use of the felted or bonded material in cooperation with other insulation materials of the finely divided volcanic ash and foamed-in-place plastic varieties will be shown presently.

Assuming that inner tank shell 50 has been given an external insulation layer 159 comprising a felted or otherwise bonded fibrous batting while leaving some space between this layer and the inner surface of outer tank shell 49, insulation of the cold liquid cargo tank space 51 may be completed by pouring a finely divided insulating powder between batting layer 159 and outer shell 49 to constitute the outer insulation layer 161. One powder which is suitable for insulation purposes is a treated volcanic ash called perlite. This ash is a mined product which as found is combined with water. Upon being heated to about 1800° F., the ash expands or bloats about 15–20% and forms particles having a closed cell structure. Another suitable powder is silica aerogel. This material comprises a chemically produced skeleton of silica. It is manufactured by the Monsanto Chemical Company and sold under the trade name "Santocel."

Finely divided, powderlike insulating materials of the kind described may be poured into a container space, and will flow quite easily around curves, corners, and any obstacles to completely fill the space, especially if slightly agitated as by vibration of the space boundaries. Thus, in the structural arrangement of FIG. 3, perlite or Santocel could be poured through trunks 133 and 135 to completely fill the space between batting layer 159 and outer tank wall 49. This wall could be tapped with hammers as might appear advisable during the pouring operation to set up vibrations locally for insuring completely free flow of the powder around such objects as the aforementioned thermally insulating bracing between tank shells 49 and 50.

The powdered insulation material will not have resilient properties in and of itself in the as-poured condition. Accordingly, it will be desirable to effect some pre-compression in the inner insulation layer 159 so that when there is relative movement between tank shells 49 and 50 in service the batting material will be able to expand as necessary to maintain a wholly continuous insulation structure, that is, prevent any gaps or "chimneys" appearing between itself and the finely divided material of outer insulation layer 161.

Pre-compression of insulation layer 159 may be effected in either one of two ways. In the first of these a partial vacuum would be drawn on inner tank shell 50 to cause at least slight inward bending of the top and side surfaces of this shell. Powdered insulation material would be poured in through trunks 133 and 135 until it overflowed them, desirably with the outer surface of tank shell 49 being vibrated simultaneously. Cover plates 137 and 139 would be replaced and tightly gasketed onto trunks 133 and 135, and then the vacuum on inner tank shell 50 would be released. The top and sides of the tank would tend to restore themselves to their normal attitudes under the influence of elastic forces, and in so doing would cause compression of batting layer 159 between their own outer surfaces and the powder of insulation layer 161.

In the second method of effecting pre-compression of insulation layer 159, a rather small quantity of cold, volatile liquid, preferably liquid methane, would be poured into tank shell 50, and allowed to evaporated. This liquid would be replenished as needed until it appeared that the inner tank had been cooled down to substantially its normal working temperature by having the cold vapors sweep over it. During all this cooling, there would be at least a substantial amount of powder material in place to form an outer insulation layer 161.

In the course of cooling, the top and side walls of tank shell 50 would tend to contract inwardly. Because of there being only a small quantity of cold liquid in the inner tank, there would be no significant tendency for the tank walls to be bowed outwardly by static liquid pressure. With the inner tank walls fully cooled, trunks 133 and 135 would be topped off with powder insulation, and their cover plates applied and tightly gasketed. After all cold liquid had been gasified or pumped out, replenishment having been discontinued, the walls of inner tank shell 50 would gradually be warmed, and tend to expand outwardly. In so doing they would cause compression of batting layer 159 between their own outer surfaces and the powder of insulation layer 161.

Again assuming that inner tank shell 50 has been given an external insulation layer 159 comprising a felted or otherwise bonded fibrous batting while leaving some space between this layer and the inner surface of outer tank shell 49, insulation of the cold liquid cargo tank space 51 may be completed by pouring a liquid material between batting layer 159 and outer shell 49, this liquid subsequently foaming in place and forming a plastic of closed cell structure to constitute the outer insulation layer 161. Because of their cellular structure and large number of dead air spaces, plastic foams are well suited as thermal insulations. In general, the thermal properties of plastic foams are determined by resin content, density, and type and size of cellular structure. The principal insulating foams available as foaming-in-place materials include but are not limited to rigid polystyrene; flexible, semi-rigid, and rigid urethanes, and rigid silicones.

In preparation for generating a foamed-in-place plastic outer insulation layer 161, a reasonably careful calculation should be made of the volume available for this foam between the batting layer 159 and the outer tank shell 49 with the batting in an uncompressed condition. The swelling and elastic characteristics of the foaming liquid or liquid mixture selected will of course be known. A quantity of liquid would be measured out which would foam freely to a volume somewhat in excess of that previously calculated to be available outside the batting layer. The liquid would be poured into this space through trunks 133 and 135, and the space sealed tightly at the trunk covers except as provision had to be made for the escape of air during the foaming process. The foam would swell up against the covers, and not being fully swollen upon filling the space normally available for it would, in tending to swell further, exert a compressive stress on the batting and itself be somewhat compressed elastically when fully set.

It would be desirable if a foaming-in-place material could be used to form the entire thermal insulation structure between the outer and inner tank shells 49 and 50. At the present time, however, no such materials are available which in the form if a foamed plastic would retain any degree of resilience in contact with a surface as cold as −259° F., the temperature likely to be very nearly achieved by the outer surface of inner tank shell 50. Any of the named plastics would crumble quite readily if subjected to any working at such a low temperature.

Accordingly, it is important in the tank construction using an inner insulation layer 159 of fibrous batting and an outer one of foamed plastic that the batting be thick enough that the temperature at the interface of the two thermal insulators not be so low that there will be any significant embrittlement of the plastic. Further in this construction, it may be desirable to apply a sealing lacquer or other appropriate sealing means to the outer surface of batting layer 159 as a coating 162 to prevent this batting from being unduly permeated by the foaming liquid before this liquid has in fact foamed to generate a cellular plastic structure as outer insulation layer 161.

In connection with both the insulation structure employing a finely divided material and that employing a foamed-in-place material as the outer insulation layer 161, it will be desirable that outer tank shell 49 have a close sliding fit on collar 153. Such a fit, possibly made by a ring of compressible material interposed between the tank shell and the collar, is needed to prevent powdered or foamed insulation material from filling into bellows 155 and impairing its action.

Figure 4:
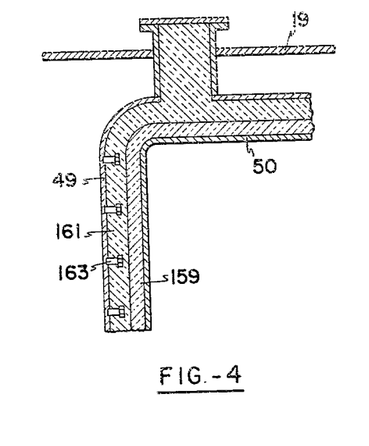
FIG. 4 represents an enlarged view of a portion of the insulated container for cold liquid cargo material shown in FIG. 3, particularly illustrating the use of studding to support the insulation material.

Referring next to FIG. 4, a two-layer insulation structure is shown similar to that of FIG. 3 in which the inner layer 159 comprises a fibrous material such as mineral wool or glass wool in batt form, and the outer layer 161 comprises a fibrous material in loose form. Attached to the inner surface of outer tank shell 49 are a plurality of studs 163 which serve to support the loose insulation 161. By furnishing this support, the studs counteract the above-noted tendency of loose fibrous insulation to settle and become compacted to a density greater than desirable.

In tank structures in which the outer tank shell 49 comprises a multiplicity of panel elements in its vertical walls which are erected sequentially, it may be quite desirable to fit them with studs 163 so that the loose insulation fibres may be stranded on them before erection. It is to be understood that some of the side panels of outer tank shell 49 in addition to cover plates 145 and 147 may be made easily removable to provide convenient access to the insulation region at various levels from time to time. It is to be understood further that studs such as 163 may also be used and indeed will be particularly desirable when there is only a single layer of loose fibrous material forming the whole of the insulation between outer and inner tank shells 49 and 50. The studs themselves will preferably be of a material such as stainless steel or a plastic which is a poor conductor of heat.

Figure 5:
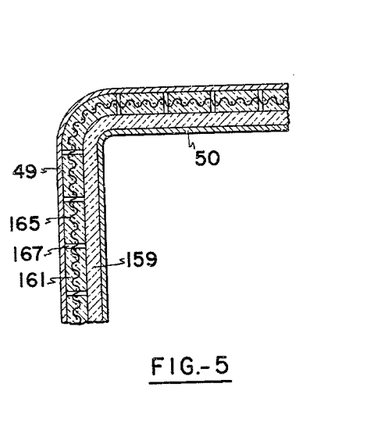
FIG. 5 represents an enlarged view of a portion of the insulated container for cold liquid cargo material taken along line 5—5 in FIG. 3, particularly illustrating the use of an expanded metal screen or grill to support the insulation material.

Referring next to FIG. 5, a two-layer insulation structure is shown similar to that of FIG. 3 in which the inner layer 159 comprises a fibrous material such as mineral wool or glass wool in batt form, and the outer layer 161 comprises a fibrous material in loose form. Running through the tank structure in the space available for the outer insulation layer is an expanded metal screen or grille or wire mesh 165 which serves to support the loose insulation 161. By furnishing this support, the mesh counteracts the above-noted tendency of loose fibrous insulation to settle and become compacted to a density greater than desirable.

Screen 165 is itself stiffened vertically by spacing members 167 which are fixed to the screen and may bear lightly against but are not fixed to the inner surface of outer tank shell 49 or the outer surface of inner insulation layer 159. It is to be understood that a screen or screens such as 165 may also be used and indeed will be particularly desirable when there is only a single layer of loose fibrous material forming the whole of the insulation between outer and inner tank shells 49 and 50. The spacing members may be of a material such as wood or plaster lath, and the screen of a material such as stainless steel. In any case, the screen 165 and spacing members 167 will be of materials which are poor conductors of heat.

Figure 6:
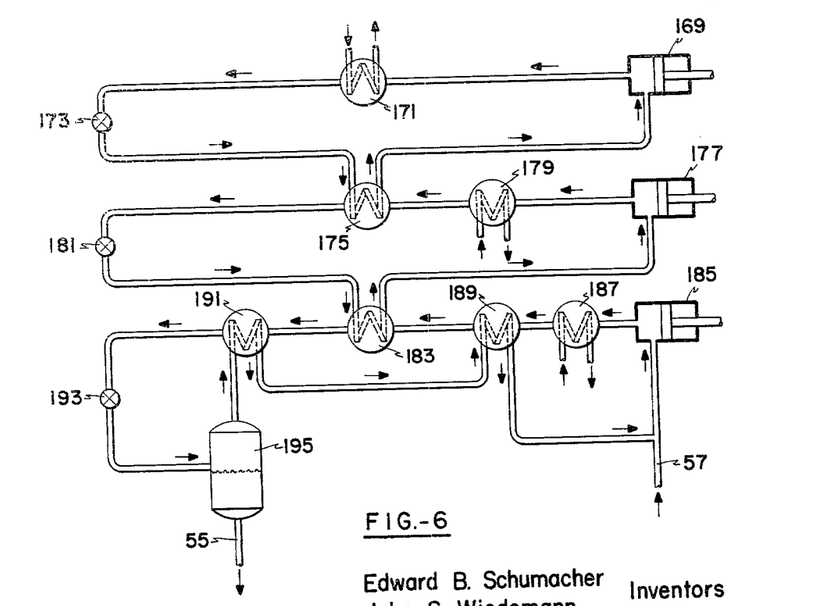
FIG. 6 represents a schematic diagram of the refrigeration apparatus provided to recondense vapors generated from the cold liquid cargo material carried in insulated containers in the tank vessel of FIGS. 1 and 2.

Referring to FIG. 6, what is shown is a three-fluid cascade refrigeration system, generally identified as 17 in FIGS. 1 and 2, which uses, for example, propane, ethylene, and methane as working substances. All of the propane and ethylene operate in closed cycles, and some of the methane does. The net material inflow of the whole system is the gassed-off methane collected from cold liquid cargo tank spaces 51 through vapor line 57, and the net material outflow is substantially this same amount of methane recondensed to a liquid flowing back to tank spaces 51 through liquid line 55. For the following discussion involving approximate numerical values of pressure and temperature, methane vapor at −259° F. will be assumed to be flowing to the refrigeration apparatus at a rate of 3,000 lbs./hr., and leaving as a liquid at the same temperature and rate; propane will be assumed to be circulating at a rate of 21,000 lbs./hr.; ethylene circulating at a rate of 9,500 lbs./hr., and the methane constantly retained in the system circulating at a rate of 1,500 lbs./hr.

A compressor 169 discharges propane gas at 191 p.s.i.a. and 300° F. to a water-cooled heat exchanger 171 wherein the propane is condensed to a liquid at 100° F. The high pressure liquid propane is expanded through throttle valve 173 to a pressure of 14.7 p.s.i.a. and a temperature of −44° F., and exists as a predominantly liquid but at least partially vaporous substance. This mixture of liquid and vaporous propane flows through a heat exchanger 175 wherein it receives heat from ethylene, and is fully transformed to a vapor at 14.7 p.s.i.a. and −44° F. in which condition it returns to the inlet of compressor 169.

A compressor 177 discharges ethylene gas at 206 p.s.i.a. and 280° F. to a water-cooled heat exchanger 179 and thence to propane-cooled heat exchanger 175 wherein the ethylene is condensed to a liquid at −35° F. The high pressure liquid ethylene is expanded through throttle valve 181 to a pressure of 14.7 p.s.i.a. and a temperature of −155° F., and exists as a predominantly liquid but at least partially vaporous substance. This mixture of liquid and vaporous ethylene flows through a heat exchanger 183 wherein it receives heat from methane, and is fully transformed to a vapor at 14.7 p.s.i.a. and −155° F. in which condition it returns to the inlet of compressor 177.

A compressor 185 discharges 4,500 lbs./hr. of methane gas at 412 p.s.i.a. and 300° F. to a water-cooled heat exchanger 187 wherein the methane is cooled to 100° F., but remains in a gaseous state at high pressure. From heat exchanger 187, the high pressure methane gas flows to another heat exchanger 189 wherein it is cooled to 65° F. by vaporous low pressure methane, but still remains in a gaseous state at high pressure. From heat exchanger 189, the high pressure methane gas flows to ethylene-cooled heat exchanger 183 wherein it is condensed to a liquid at −145° F. The high pressure liquid methane then flows to heat exchanger 191 wherein it is subcooled to −155° F. by vaporous low pressure methane.

From heat exchanger 191, the subcooled liquid methane flows to throttle valve 193 wherethrough it is expanded to a pressure of 14.7 p.s.i.a. and a temperature of −259° F., and a state condition wherein it is predominantly liquid but at least partially vaporous substance. This mixture of liquid and vaporous methane flows to a flash chamber 195 wherein a separation of the liquid and vapor phases is effected. Cold liquid methane is drawn off from the bottom of chamber 195 through line 55 at 14.7 p.s.i.a. and −259° F., and at a rate of 3,000 lbs./hr. for return to tank spaces 51.

Cold vaporous methane is drawn off from the top of chamber 195 at 14.7 p.s.i.a. and −259° F., at a rate of 1,500 lbs./hr. This vapor stream flows successively through heat exchanger 191 wherein it is superheated to −190° F., and heat exchanger 189 wherein it is superheated to −50° F. Upon leaving heat exchanger 189, the superheated methane gas stream is mixed with the saturated methane vapor coming back from tank spaces 51 through line 57 to make a total gas feed at the rate of 4,500 lbs./hr. to the inlet of compressor 185. In its normal utilization, refrigeration apparatus 17 will be most heavily loaded when tank spaces 51 are being filled with cold liquid cargo.

Figure 7:
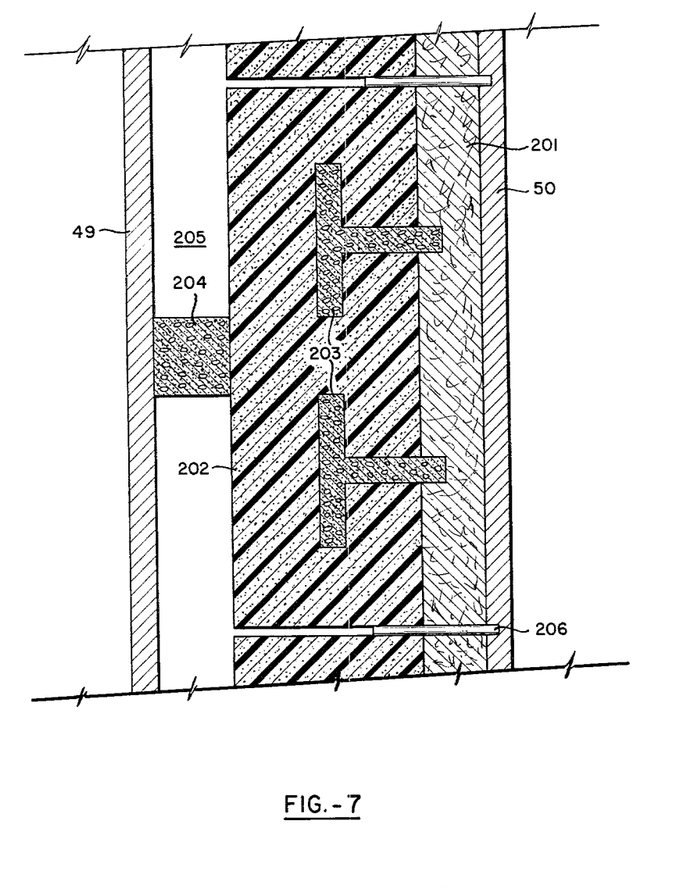
FIG. 7 represents a schematic cross-sectional diagram of a prefabricated insulation block containing a fibrous insulating zone, a plastic foam insulating zone and support members of a rigid, castable concrete having good insulating properties.

Referring finally to FIG. 7, what is shown is a prefabricated, three-component insulation block containing all the desirable features of the multi-layer insulation previously described plus those benefits derived from ease of handling and efficient utilization of space. These blocks could be manufactured elsewhere and then put in place during the construction or refitting of the vessel.

The face of the block placed in contact with the inner tank wall 50 is made of a compressible, fibrous, insulating material such as mineral wool or glass wool previously described in this specification. This fibrous zone 201 is bonded by suitable adhesives to a rigid plastic foam zone having good insulating properties. Foams made from polyurethane or polyethylene are very suitable for this purpose. Polyurethane foams are the most preferred. In this manner, the plastic foam is insulated from the extremely cold temperatures to be found at the inner tank wall 50 and the foam will therefore not become embrittled.

Furthermore the blocks contain T-shaped, load-bearing beams 203. These beams are preferably made from an insulating, castable concrete such as previously described herein for use in the rigid support layer 127. These T-beams take up the expansion thrust of the inner tank 50 and pass the force to the foam zone 202. This prevents complete compression of the fiber zone 201, which compression would result in a loss of insulating efficiency. While these rigid sections are more heat conductive than the other insulating materials used in the blocks, the actual heat transferred is kept to a minimum by utilizing the T-shape to present a very narrow path for such heat flow.

These prefabricated blocks can be held to the sides of the inner tank wall 50 by installing studs or spikes 206 in said wall to hold the blocks in place. Additional support can be obtained by wedging in a block made of the castable concrete such as 204. However, additional support can be obtained with added insulating benefits by filling area 205 with either finely divided insulating powder or a foam-in-place plastic, both materials having been discussed previously. It is also possible to fill this area with additional sections of the prefabricated insulating blocks which can be cut to fit the exact dimensions of the space between the outer wall 49 and the inner layer of blocks.

The same procedures followed for precompressing the multi-layered insulations may also be used to achieve precompression of these insulating blocks. These blocks can be installed while the storage tanks 51 are contracted by either the introduction of cold methane or by vacuum. The subsequent return of the tank walls 50 to their regular position causes the blocks to be compressed. This results in strong lateral support for the storage tanks which will resist any shifting in the position of said tanks during the course of a sea voyage.

Although this invention has been described with a certain degree of particularity, it is to be understood that the present disclosure has been made only by way of example, especially with regard to numerical quantities given herein, and that numerous changes in the details of construction and the combination and arrangement of parts may be resorted to without departing from the spirit and scope of this invention as hereinafter claimed.

What is claimed is:

1. In an improved vessel for bulk transportation of liquids such as methane which boil at temperatures substantially below 0° F., which vessel includes an insulated tank surrounded by thermal insulation space bounded by an inner liner impervious to said liquid and an outer shell spaced from said liner, said shell and liner constituting boundaries and being subject to relative movement to vary the insulation space volume, the combination which comprises a multiple layer insulation in said space between said shell and liner with a resilient fibrous inner insulation material layer next to said liner and surrounded by an outer body of relatively non-resilient insulating material which has a tendency to settle by gravity on relative movement of said boundaries, and plural means affixed to one of said boundaries projecting into the space occupied by said relatively non-resilient material to inhibit said settling by gravity, the quantity of non-resilient material being sufficient to apply an elastic compression force to the resilient fibrous material.

2. Combination according to claim 1 wherein the plural means are structural thrust transmitting members of low heat transmission characteristics.

3. The marine vessel of claim 1 wherein said double layer insulation comprises prefabricated insulating blocks, said blocks comprising a compressible fibrous insulating material bonded to a rigid plastic foam body, said fibrous material covering at least one face of said rigid plastic foam body, said face being the one in closest proximity to the inner liner wall, and including thrust transmitting means which comprises rigid T-shaped members having substantial insulating qualities, a flat portion of each said member bearing laterally with respect to and against said relatively nonresilient layer, edge and side portions of the adjacent leg of said member bearing against said inner resilient layer to permit that layer supported expansive and contractive freedom within predetermined limits.

4. In an improved marine vessel for bulk transportation containing an insulated tank structure adapted to store liquids such as methane and the like, which liquids boil at temperatures very substantially below 0° F., said tank comprising an inner liquid-tight liner and an outer shell spaced from said inner liner, the improvement comprising a composite insulation in said space, said insulation comprising a rigid non-compressible insulator body at the bottom and a pre-compressible double layer insulation between the sides of said shell and said liner, said double layer insulation comprising a resiliently compressed inner blanket of fibrous material which retains elasticity at the storage temperature and an outer body of relatively non-elastic flowable relatively non-resilient insulation material filling the space between said fibrous material and said shell, rigid means bearing against said inner and outer layers for transmitting thrust to inhibit compression of said inner resilient layer and to prevent progressive loss of resiliency of said inner layer after successive expansion and contraction thereof, and further means for inhibiting the flow of material in the outer layer and settling under repeated expansion and contraction forces.

References Cited by the Examiner

UNITED STATES PATENTS

| | | | |
|---|---|---|---|
| 2,323,297 | 7/1943 | Collins | 220—9 |
| 2,650,478 | 9/1953 | Brown | 62—50 |
| 3,088,621 | 5/1963 | Brown | 220—9 |

FOREIGN PATENTS

| | | |
|---|---|---|
| 228,746 | 5/1960 | Australia. |
| 612,919 | 1/1961 | Canada. |
| 796,450 | 6/1958 | Great Britain. |
| 840,952 | 7/1960 | Great Britain. |

ROBERT A. O'LEARY, *Primary Examiner.*